(12) United States Patent
Grebe et al.

(10) Patent No.: US 9,272,446 B2
(45) Date of Patent: Mar. 1, 2016

(54) PROCESS FOR MELTING/SINTERING POWDER PARTICLES FOR THE LAYER-BY-LAYER PRODUCTION OF THREE-DIMENSIONAL OBJECTS

(71) Applicants: Maik Grebe, Bochum (DE); Wolfgang Diekmann, Waltrop (DE); Sigrid Hessel-Geldmann, Haltern am See (DE); Juergen Kreutz, Marl (DE)

(72) Inventors: Maik Grebe, Bochum (DE); Wolfgang Diekmann, Waltrop (DE); Sigrid Hessel-Geldmann, Haltern am See (DE); Juergen Kreutz, Marl (DE)

(73) Assignee: EVONIK DEGUSSA GmbH, Essen (DE)

( * ) Notice: Subject to any disclaimer, the term of this patent is extended or adjusted under 35 U.S.C. 154(b) by 366 days.

(21) Appl. No.: 13/767,120

(22) Filed: Feb. 14, 2013

(65) Prior Publication Data

US 2013/0216836 A1    Aug. 22, 2013

(30) Foreign Application Priority Data

Feb. 17, 2012    (DE) .................... 10 2012 202 487

(51) Int. Cl.
*B29C 41/02* (2006.01)
*B29C 35/08* (2006.01)
*B32B 5/16* (2006.01)
*B29C 67/00* (2006.01)
*B22F 3/105* (2006.01)

(52) U.S. Cl.
CPC ........... *B29C 35/0805* (2013.01); *B22F 3/1055* (2013.01); *B29C 67/0077* (2013.01); *B32B 5/16* (2013.01); *B22F 2003/1056* (2013.01); *Y10T 428/31504* (2015.04)

(58) Field of Classification Search
CPC ................................................... B29C 67/0077
USPC ........................................................ 264/85, 497
See application file for complete search history.

(56) References Cited

U.S. PATENT DOCUMENTS

| | | | |
|---|---|---|---|
| 5,846,370 A * | 12/1998 | O'Connor | 264/85 X |
| 6,054,192 A | 4/2000 | Otsuka et al. | |
| 6,136,948 A | 10/2000 | Dickens, Jr. et al. | |
| 6,245,281 B1 * | 6/2001 | Scholten et al. | 264/497 |
| 6,554,600 B1 | 4/2003 | Hofmann et al. | |
| 2002/0015654 A1 | 2/2002 | Das et al. | |
| 2003/0127436 A1 | 7/2003 | Darrah et al. | |
| 2004/0026807 A1 * | 2/2004 | Andersson et al. | 264/40.1 |
| 2004/0148048 A1 * | 7/2004 | Farnworth | 700/119 |
| 2006/0145381 A1 | 7/2006 | Larsson | |
| 2007/0176312 A1 * | 8/2007 | Clark et al. | 264/497 X |
| 2010/0305743 A1 | 12/2010 | Larsson | |
| 2014/0099476 A1 * | 4/2014 | Subramanian et al. | 428/164 |

FOREIGN PATENT DOCUMENTS

| | | |
|---|---|---|
| DE | 101 12 591 A1 | 10/2001 |
| DE | 10208150 A1 * | 9/2002 |

(Continued)

OTHER PUBLICATIONS

European Search Report issued Jun. 5, 2013, in Patent Application No. 13152726.9 (with English Translation of Category of Cited Documents).

*Primary Examiner* — Leo B Tentoni
(74) *Attorney, Agent, or Firm* — Oblon, McClelland, Maier & Neustadt, L.L.P.

(57) ABSTRACT

A process for melting/sintering powder particles for layer-by-layer production of three-dimensional objects wherein a layer of powder particles is irradiated by a nonlinear path of an electromagnetic radiation is provided. Also provided are an apparatus to conduct the process and three dimensional objects obtained by the process.

10 Claims, 6 Drawing Sheets

(56) References Cited

FOREIGN PATENT DOCUMENTS

| DE | 102 33 389 A1 | 2/2003 |
|---|---|---|
| DE | 103 36 561 A1 | 3/2005 |
| EP | 0 856 393 A2 | 8/1998 |
| EP | 0 856 393 A3 | 8/1998 |
| WO | WO 96/06881 | 3/1996 |
| WO | WO 00/21736 | 4/2000 |
| WO | WO 01/91924 A1 | 12/2001 |
| WO | WO 2004/056510 A1 | 7/2004 |

* cited by examiner

PROCESS FOR MELTING/SINTERING POWDER PARTICLES FOR THE LAYER-BY-LAYER PRODUCTION OF THREE-DIMENSIONAL OBJECTS

CROSS REFERENCE TO RELATED APPLICATIONS

This application claims priority to German Application No. 102012202487.5, filed Feb. 17, 2012, the disclosure of which is incorporated herein by reference, in its entirety.

BACKGROUND OF THE INVENTION

The present invention relates to a process for melting/sintering powder particles for the layer-by-layer production of three-dimensional objects.

A task frequently encountered in very recent times is the rapid production of prototypes. Processes to quickly prepare prototype objects are described as rapid prototyping/rapid manufacturing, or else additive fabrication processes. Particularly suitable processes are those which are based on pulverulent materials and in which the desired structures are produced layer-by-layer through selective melting and solidification. Supportive structures for overhangs and undercuts may be omitted with the use of pulverulent materials because sufficient supportive effect is provided from the construction-field plane surrounding the molten regions. The downstream operation of removing supports is also omitted. The processes may also suitable for short-run production. The construction chamber temperature may be selected in such a way that the structures produced layer-by-layer do not warp during the construction process.

A process which has particularly good suitability for the purpose of rapid prototyping is selective laser sintering (SLS). In this process, plastics powders are selectively briefly irradiated by a laser beam in a chamber, and the powder particles impacted by the laser beam therefore melt. The molten particles coalesce and rapidly resolidify to give a solid mass. This process can provide easy and rapid production of three-dimensional products by repeated irradiation of a succession of freshly applied layers.

The process of laser sintering (rapid prototyping) for producing mouldings made of pulverulent polymers is described in detail in U.S. Pat. No. 6,136,948 and WO 96/06881 (both DTM Corporation). A wide variety of polymers and copolymers are claimed for this application, examples being polyacetate, polypropylene, polyethylene, ionomers and polyamide.

The coordinate system of this type of apparatus is usually defined such that the x coordinate runs within the construction-field plane parallel to the traverse of the powder-application apparatus. The location of the y coordinate is within the construction-field plane, perpendicular to the traverse of the powder-application apparatus. The z coordinate is perpendicular to the construction-field plane.

In conventionally known processes and apparatuses for the prototyping, the area requiring selective hardening is traversed in straight-line sections, line by line (x-direction) or column by column (y-direction) by a beam of electromagnetic radiation. In the present application the beam of electromagnetic radiation may be referred to as an energy beam. DE 10233389 A1 moreover discloses a straight-line traverse within particular angles within the x,y-plane.

According to the methods conventionally known, irradiation lines in the form of parallel straight-line sections are bounded by the external edge of the area requiring hardening. The distance between the lines or columns may be adjustable. The design of the energy beam is usually such that, as far as possible, the focal point of the energy beam is within the construction-field plane of the pulverulant material. In order to improve the surface of the object to be produced, the profile of the area requiring hardening is often additionally traversed by the energy beam. The time required by the energy beam to traverse the region is determined mainly by the traverse speed of the energy beam and the distance between the individual lines or columns. An obvious way of accelerating the process is therefore to increase the traverse speed of the energy beam and/or the distance between the lines or columns. The traverse speed of the energy beam cannot be increased without restriction because if acceleration effects or retardation effects are excessive, it becomes impossible to position the scanner system mirrors with precision. The objects produced then have uneven areas at the edges. Nor can the distance between the radiation lines be increased without restriction because, starting at a particular distance, the bonding between the individual irradiation lines becomes inadequate. The mechanical properties of the objects produced are then impaired.

SUMMARY OF THE INVENTION

An object of the present invention to provide an improved process for producing three-dimensional objects which can reduce the time required by the energy beam to traverse the region requiring hardening, without reduction in the quality of the object produced.

This and other objects have been achieved by the present invention, the first embodiment of which includes a process for layer-by-layer production of a three-dimensional object, the process comprising:

applying a layer of a powder material which is hardenable by exposure to electromagnetic radiation onto a vertically moveable construction platform in a construction chamber to obtain a planar layer of the powder material;

focusing a beam of electromagnetic radiation through a lens on a plane of the material layer;

traversing the focused beam across the plane of the material layer in a non-linear path as directed by a control unit;

selectively melting the material under the focus of the beam according to the control unit to obtain a layer having a completed melt pattern;

lowering the vertically moveable construction platform; and adding a layer of the powder material which is hardenable by exposure to electromagnetic radiation onto the layer having a completed melt pattern;

repeating the controlled melting; and continuously adding a further layer of the powder material which is hardenable over the previous completed layer and repeating the controlled melting until the melt pattern of three dimensional object is formed;

cooling the melt pattern to harden to the three dimensional shape; and removing the three dimensional object from adhering powder material not melted by the focused beam.

In a preferred embodiment of the process of the present invention, the non-linear path of the focused beam comprises two components of motion in the plane of traverse.

In a highly preferred embodiment, the non-linear path of the focused beam comprises a periodic oscillation in the plane of traverse.

In another highly preferred embodiment, the non-linear path of the focused beam comprises a superposition of a translational motion on a rotary motion.

DETAILED DESCRIPTION OF THE PREFERRED EMBODIMENTS

In a first embodiment, the present invention provides first embodiment of which includes a process for layer-by-layer production of a three-dimensional object, the process comprising:

applying a layer of a powder material which is hardenable by exposure to electromagnetic radiation onto a vertically moveable construction platform in a construction chamber to obtain a planar layer of the powder material;

focusing a beam of electromagnetic radiation through a lens on a plane of the material layer;

traversing the focused beam across the plane of the material layer in a non-linear path as directed by a control unit;

selectively melting the material under the focus of the beam according to the control unit to obtain a layer having a completed melt pattern;

lowering the vertically moveable construction platform; and adding a layer of the powder material which is hardenable by exposure to electromagnetic radiation onto the layer having a completed melt pattern;

repeating the controlled melting; and continuously adding a further layer of the powder material which is hardenable over the previous completed layer and repeating the controlled melting until the melt pattern of three dimensional object is formed;

cooling the melt pattern to harden to the three dimensional shape; and removing the three dimensional object from adhering powder material not melted by the focused beam.

Figure 5:
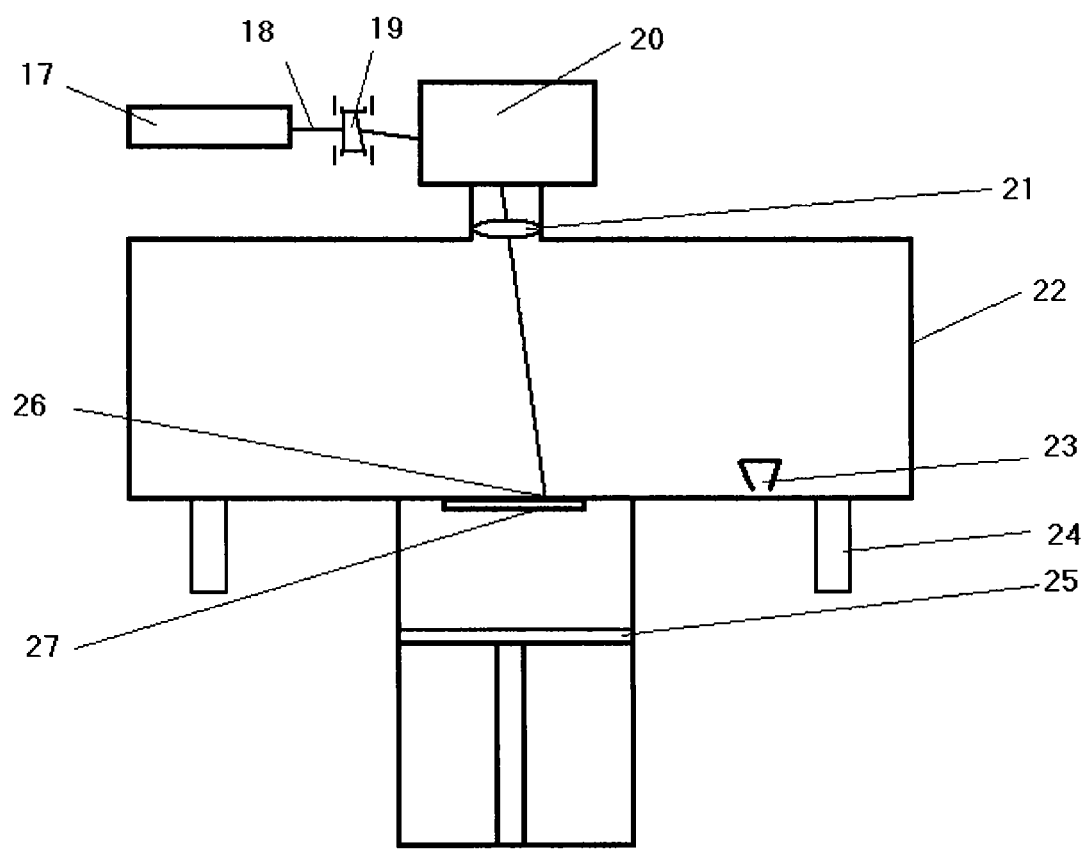
FIG. 5 shows a schematic diagram of an apparatus for producing a three dimensional object according to the present invention.

The present invention provides a process for the layer-by-layer production of three-dimensional objects (mouldings) in an apparatus according to FIG. 5, comprising a construction chamber (22) with an adjustable-height construction platform (25), and with an apparatus (23) for applying, onto the construction platform (25), a layer of a material that can be hardened by exposure to electromagnetic radiation, and with irradiation equipment comprising a radiation source (17) emitting electromagnetic radiation and a control unit (20), and with a lens system (21) located in the beam path of the electromagnetic radiation, where the layer of a material that can be hardened by exposure to electromagnetic radiation is traversed non-linearly, i.e. in non-straight lines (irradiation lines or scanning lines) by the electromagnetic radiation. The lines here are therefore not parallel.

Surprisingly, it has been found that the time for the beam of the electromagnetic radiation source to traverse the area requiring hardening may be reduced if the energy beam traverses the area requiring hardening non-linearly (in non-parallel manner), i.e. the irradiation lines are selected in such a way that non-linear paths of traverse are formed. The non-linear traverse of the electromagnetic radiation is preferably achieved by a movably mounted optically active element (19).

For the purposes of the present invention, irradiation lines are the regions traversed by the beam of the electromagnetic radiation within the construction-field plane (26).

In the general method of carrying out the process according to the invention, an adjustable-height construction platform (25) is lowered in a construction chamber (22), and an apparatus (23) is used to apply, to the construction platform (25), a layer of a material that can be hardened by exposure to electromagnetic radiation. The temperature of the said material may be elevated, and then the material is selectively melted or sintered at the desired sites by focus of the irradiation beam from radiation source (17) emitting electromagnetic radiation. The focal point of the electromagnetic radiation may be deflected to the appropriate sites in the construction-field plane (26) by a control unit (20) and of a lens (21) located in the beam path of the electromagnetic radiation.

Figure 1:
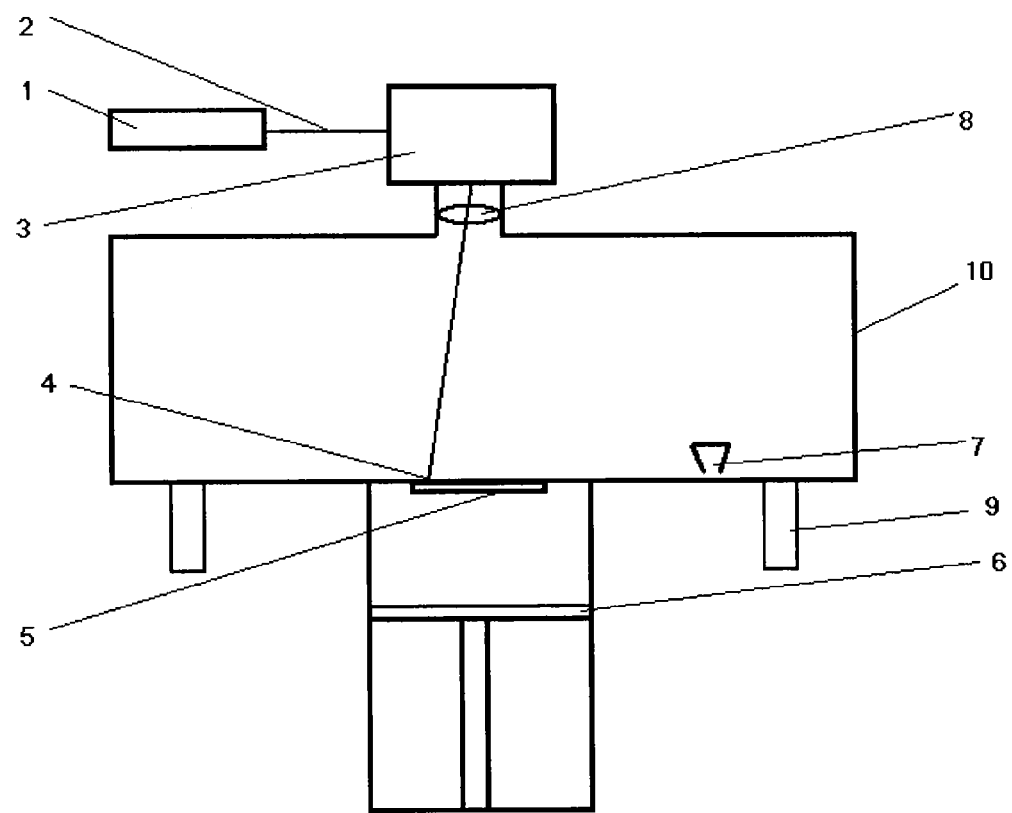
FIG. 1 shows a schematic diagram of a conventional apparatus for producing a three dimensional object.

FIG. 1 shows the principles of the conventional structure of an apparatus for producing three-dimensional objects. The component is positioned centrally in the construction field. The laser beam (2) from a laser (1) is deflected by means of a scanning system (3) through the lens (8) onto a powder surface (4) which is temperature-controlled and inertised, preferably inertised with nitrogen, and which is part of the object (5) to be formed. The lens has the function of separating the remaining optical components, e.g. the mirror of the scanner, from the construction-chamber atmosphere. The lens is often designed as F-theta lens system, in order to ensure maximum homogeneity of focal point over the entire field of operation. Located within the construction chamber is the application apparatus (7) for applying, to the construction platform (6), the material requiring hardening.

Figure 2:
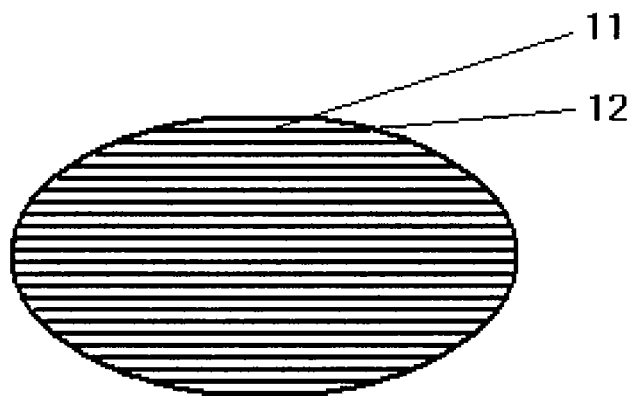
FIG. 2 shows the lines of traverse of a beam of electromagnetic radiation in one direction across the area of irradiation according to a conventional method.
Figure 3:
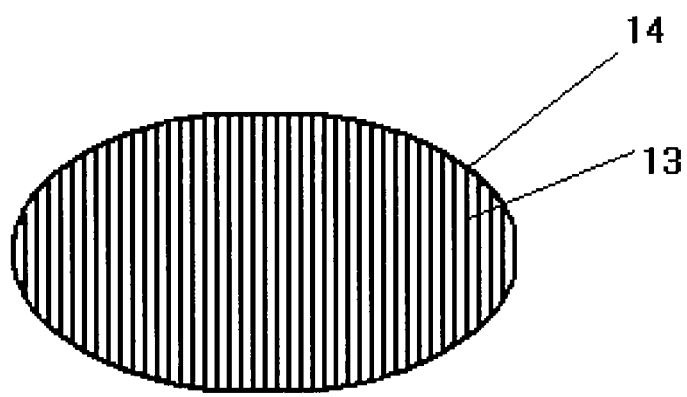
FIG. 3 shows the lines of traverse of a beam of electromagnetic radiation perpendicular to the direction across the area of irradiation indicated in FIG. 2 according to a conventional method.

FIGS. 2 and 3 depict the process for traversing the area requiring hardening as conventionally conducted in the apparatus of FIG. 1. The beam of electromagnetic radiation is controlled in such a way that the irradiation lines are straight-line segments, bounded by the edge of the area (12, 14) requiring hardening. The overall effect is that the beam of electromagnetic radiation is conducted linearly in one direction of motion across the surface requiring irradiation, i.e. the motion has only one component of motion in the plane of motion. The irradiation lines run either in the x-direction (11) or in the y-direction (13). The orientation of the irradiation lines is often changed so as to alternate from layer to layer, i.e. a layer is first traversed in the x-direction, and the next layer is then traversed in the y-direction.

Figure 4:
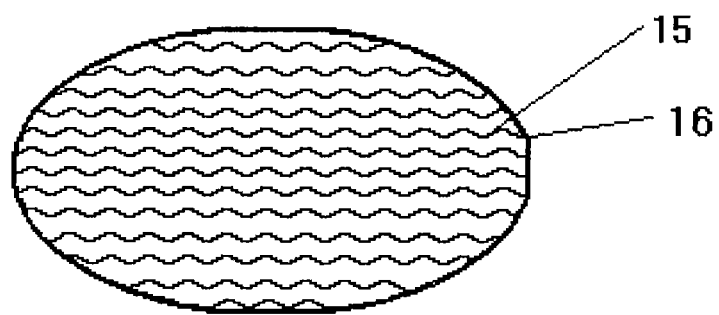
FIG. 4 shows the lines of traverse of a beam of electromagnetic radiation according to an embodiment of the present invention.

FIG. 4 shows an embodiment of the process according to the invention for traversing the area requiring hardening. The beam of electromagnetic radiation is controlled in such a way that the irradiation lines bounded by the edge (16) of the area requiring hardening on the construction-field plane are non-linear (15). The surface requiring irradiation may therefore be traversed by the electromagnetic radiation with a motion having two components of motion in the plane of motion, i.e. the beam is moved not only in the x-direction but also in the y-direction, based on the construction-field plane, with progressive change of the angle within the x,y-plane.

The non-straight lines may take the form of a spline of degree n. A spline of degree n is a function assembled from polynomials of at most degree n. It may be preferable that the irradiation lines take the form of a periodic oscillation, and for the purposes of the present invention all types of oscillation, for example rectangular, sinusoidal or triangular oscillation, and mixed forms thereof, are considered to be periodic oscillations.

Figure 7:
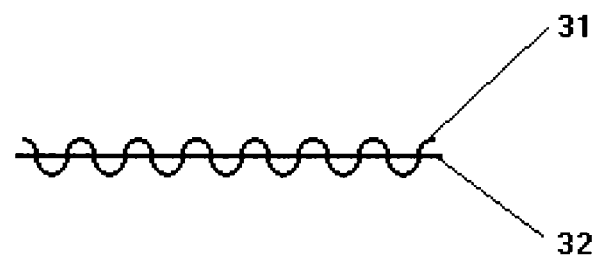
FIG. 7 shows one embodiment of a nonlinear irradiation line according to the present invention.

FIG. 7 shows an embodiment of a non-linear irradiation line having periodic oscillation. The irradiation line (31) oscillates around the imaginary segment (32) defined by the edge of the area requiring hardening. This gives motion with a component of motion in the direction of advance which in particular may be linear and with a second component of motion perpendicular to the first component of motion.

In a preferred embodiment, the beam of electromagnetic radiation may oscillate around the imaginary segment, i.e. the component of motion in the direction of advance, with an amplitude of at least 20% and at most 500% of the distance between the imaginary segments. It is particularly preferable that the beam of electromagnetic radiation oscillates around the imaginary segment with an amplitude of at least 40% and at most 400% of the distance between the imaginary segments. It is very particularly preferable that the beam of electromagnetic radiation oscillates around the imaginary segment with an amplitude of at least 50% and at most 300% of the distance between the imaginary segments. These values include all ranges and sub-ranges within the described ranges. The frequency of oscillation of the beam of electromagnetic radiation may be at least 20 Hz, preferably at least 50 Hz and particularly preferably at least 100 Hz. These values include all values and sub-values between the described values.

Figure 8:
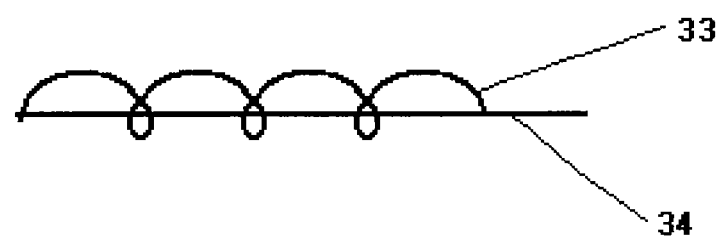
FIG. 8 shows another embodiment of a nonlinear irradiation line according to the present invention.

In another preferred embodiment, the layer of a material that may be hardened by exposure to electromagnetic radiation can be traversed by the electromagnetic radiation with superposition of a translation motion on a rotary motion. The irradiation line therefore results from motion with a component of motion in and opposed to the direction of advance which in particular may be linear and a second component of motion perpendicular to the first component of motion. FIG. 8 shows an example of this embodiment. In FIG. 8, the irradiation line (33) is conducted in the manner of a cycloid around the imaginary segment (34). A cycloid, also termed cyclic curve, wheel curve or roulette, is the path described by a point on the circle that is rolling along a stationary curve, for example a straight line. The irradiation line can be designed as a conventional, curtate or prolate cycloid. A conventional cycloid is produced by a circle rolling along a straight line. A curtate cycloid is produced by the path described by a point within the circle. In contrast, a precondition for a prolate cycloid is that a point outside the rolling circle moves concomitantly with the circle. The preferred ranges described above relative to periodic oscillations are analogously and correspondingly applicable to this particular embodiment.

In another preferred embodiment of the process according to the invention, the parameters of the irradiation line may be adapted in relation to amplitude and frequency so as to be appropriate to the area to be traversed. It may therefore be possible to offset the non-linear irradiation lines in relation to one another in order to obtain particular mechanical properties of the component.

The present invention further provides an apparatus (FIG. 5) for the layer-by-layer production of three-dimensional objects comprising a construction chamber (22) with an adjustable-height construction platform (25), and with an apparatus (23) for applying, onto the construction platform (25), a layer of a material that can be hardened by exposure to electromagnetic radiation, and with irradiation equipment comprising a radiation source (17) emitting electromagnetic radiation and a control unit (20), and with a lens system (21) located in the beam path of the electromagnetic radiation, for irradiating sites which are within the layer and which correspond to the object (26). Located in the beam path there is moreover a movably mounted optically active element (19) which can deflect the electromagnetic radiation.

The movably mounted optically active element (19) which can deflect the electromagnetic radiation may involve any of the arrangements which are known to the person skilled in the art of mirrors and deflection units, and in particular wedge prisms may be employed. Wedge prisms may be employed for the deflection of laser beams. Various wedge prisms are available for selection for various deflection angles, and they can also be combined if necessary. In particular, rotation may be used to deflect the beam in such a way that the beam describes a circle when the wedge prism is rotated. Appropriately, high rotation rates of the wedge prism may therefore produce very rapid circular deflections of the beam. This may be particularly advantageous for the non-linear motion according to the present invention.

Figure 6:
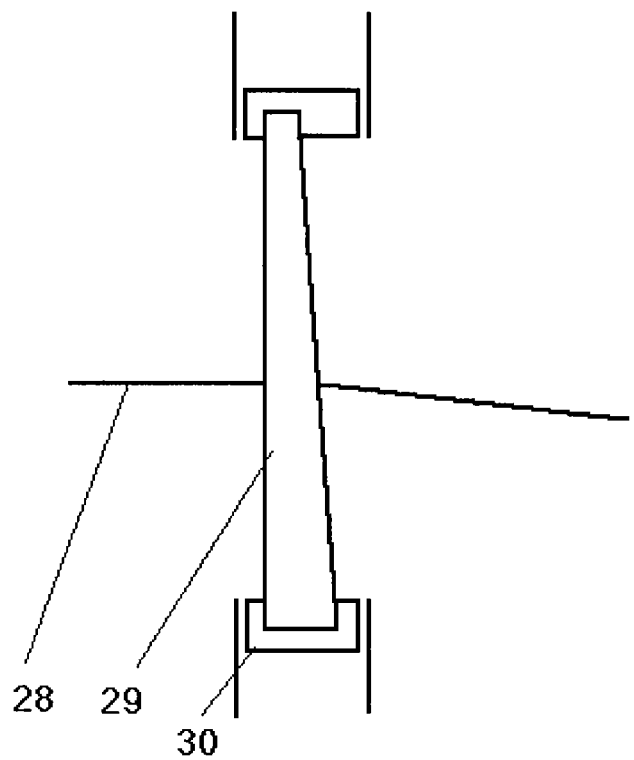
FIG. 6 shows a schematic diagram of control of the positioning and orientation of an optically active element according to the present invention.

The positioning and orientation of the optically active element, in particular of the wedge prisms, may be controlled. FIG. 6) depicts an example of this embodiment. The energy beam (28) is deflected by means of the movably mounted optically active element (29), in this case a wedge prism. The wedge prism rotates around the axis of rotational symmetry. The mounting (30) of the wedge prism may be designed in such a way that the wedge prism can be moved in accordance with the desired deflection. It may be possible to combine a plurality of optically active elements. It may also be possible, as a function of requirement for deflection, to move the required optically active elements into the beam path and, respectively, out of the beam path. In a preferred embodiment the deflection of the electromagnetic beam is less than 10°, particularly preferably less than 5° and very particularly preferably less than 1°.

In principle, any of the polymer powders known to the person skilled in the art may be suitable for use in the apparatus according to the invention or in the process according to the invention. In particular, thermoplastic and thermoelastic materials are suitable, for example polyethylene (PE, HDPE, LDPE), polypropylene (PP), polyamides, polyesters, polyester esters, polyether esters, polyphenylene ethers, polyacetals, polyalkylene terephthalates, in particular polyethylene terephthalate (PET) and polybutylene terephthalate (PBT), polymethyl methacrylate (PMMA), polyvinyl acetal, polyvinyl chloride (PVC), polyphenylene oxide (PPO), polyoxymethylene (POM), polystyrene (PS), acrylonitrile-butadiene-styrene (ABS), polycarbonates (PC), polyether sulfones, thermoplastic polyurethanes (TPU), polyaryl ether ketones, in particular polyether ether ketone (PEEK), polyether ketone ketone (PEKK), polyether ketone (PEK), polyether ether ketone ketone (PEEKK), polyaryl ether ether ether ketone (PEEEK) or polyether ketone ether ketone ketone (PEKEKK), polyetherimides (PEI), polyarylene sulphides, in particular polyphenylene sulphide (PPS), thermoplastic polyimides (PI), polyamideimides (PAI), polyvinylidene fluorides, and also copolymers of these thermoplastics, e.g. a polyaryl ether ketone (PAEK)/polyaryl ether sulphone (PAES) copolymer, mixtures and/or polymer blends. It is particularly preferable that the polymer powder comprises at least one polyamide or polyether ketone, such as PA6, PA66, PA610, PA613, PA1010, PA106, PA11, PA12, PA1012, PA1013 or a mixture of these, in particular nylon-12, nylon-6, nylon-6,6 or PEEK, where the polyamides mentioned are particularly preferred.

Metallic powders such as iron, titanium or aluminum may moreover be suitable, as well as ceramic powders. In a preferred embodiment of the present invention polymer powders are used.

In a general method of operation, data concerning the shape of the object (27) requiring production is first generated or stored in a computer on the basis of a design program or the like. The processing of the data for producing the object involves dissecting the object into a large number of horizontal layers which are thin in comparison with the size of the object, and providing the geometric data by way of example in the form of data sets, e.g. CAD data, for each of the said large number of layers. This data for each layer may be generated and processed prior to production or simultaneously with production of each layer.

The construction platform (25) is then firstly moved by the height-adjustment apparatus to the highest position, in which the surface of the construction platform (25) is in the same plane as the surface of the construction chamber, and it is then lowered by an amount corresponding to the intended thickness of the first layer of material, in such a way as to form, within the resultant recess, a depressed region delimited laterally by the walls of the recess and underneath by the surface of the construction platform (25). A first layer of the material to be solidified, with the intended layer thickness, is then introduced by an applicator (23) into the cavity formed by the recess and by the construction platform, or into the depressed region, and a heating system is optionally used to heat the sample to a suitable operating temperature, for example from 100° C. to 360° C., preferably from 120° C. to 200° C., particularly preferably from 140° C. to 160° C. The control unit (20) then controls the deflection device in such a way that the deflected light beam (18) successively encounters all of the positions within the layer and sinters or melts the material there. A firm initial basal layer may thus be formed. In a second step, the construction platform (25) is lowered by means of the height-adjustment apparatus by an amount corresponding to one layer thickness, and a second layer of material is introduced by the applicator into the resultant depressed region within the recess, and the heating system is in turn optionally used to heat that layer.

In one embodiment, the deflector device may be controlled by the control unit in such a way that the deflected light beam encounters only that region of the layer of material that is adjacent to the internal surface of the recess, and solidifies the layer of material there by sintering, thus producing a first annular wall layer with a wall thickness of about 2 to 10 mm which completely surrounds the remaining pulverulent material of the layer. This portion of the control system therefore provides a device for producing, simultaneously with formation of the object in each layer, a container wall surrounding the object to be formed.

After the construction platform has been lowered by an amount corresponding to the layer thickness of the next layer, and the material has been applied and heated in the same way as above, the production of the object itself may be started. For this, the control unit controls the deflector device in such a way that the deflected light beam encounters those positions of the layer which are to be solidified in accordance with the coordinates stored in the control unit for the object to be produced. The procedure for the remaining layers is analogous. In cases where it is desirable to produce an annular wall region in the form of a vessel wall which encloses the object together with the remaining, unsintered material, and thus prevents escape of the material when the construction platform (6) is lowered below the base of the construction chamber, the device sinters an annular wall layer onto the annular wall layer thereunder, for each layer of the object. Production of the wall may be omitted if a replaceable vessel corresponding to EP 1037739, or a fixedly incorporated vessel, is used.

After cooling, the resultant object can be removed from the apparatus.

The three-dimensional objects produced by the processes according to the invention are likewise embodiments of the present invention.

It is assumed that even in the absence of further details it is possible for a person skilled in the art to utilize the above description to the widest possible extent. The preferred embodiments and examples are therefore to be interpreted simply as descriptive disclosure, and certainly not as disclosure which is in any way limiting.

Having generally described this invention, a further understanding may be obtained by reference to certain specific examples which are provided herein for purposes of illustration only, and are not intended to be limiting unless otherwise specified.

Alternative embodiments of the present invention can be obtained analogously.

EXAMPLES

Unless otherwise stated, operations in the examples are in accordance with the description below. The construction chamber (22) was brought to process temperature within 120 min. The temperature in the middle of the construction-field plane was defined as construction-chamber/process temperature. Prior to the first irradiation, 40 layers of powder were applied. The laser beam (18) from a laser (17) was deflected by a scanner system (20) through the lens (21) onto a temperature-controlled and inertised (N2) construction-field plane (26).

The component to be irradiated was positioned centrally within the construction field. A rectangular area (27) measuring 170 mm×60 mm was melted or sintered by means of the laser. The construction platform (25) was then lowered by 0.15 mm, and a fresh powder layer was applied at a rate of 100 mm/s by applicator (23). These steps were repeated until a three-dimensional component was produced with a height of 4 mm. The area requiring irradiation was traversed by the laser in alternating fashion from layer to layer in the x- or y-direction. The time required by the laser beam to traverse the rectangular area was recorded. Once the irradiation was completed, 40 further layers were again applied before the heating elements of the SLS machine were switched off and the cooling phase was initiated.

After a cooling time of at least 12 hours, the component was removed and freed from the adhering powder. The component was then cut into 6 rectangular components each measuring 170 mm×10 mm×4 mm. The mechanical properties of these components were determined in accordance with DIN EN ISO 527 in a Zwick Z020 (test velocity 50 mm/min, test velocity for modulus of elasticity 1 mm/min, clamping distance at start position 115 mm, measured length, standard distance 50 mm, start of modulus of elasticity determination 0.05%, end of modulus of elasticity determination 0.25%).

The design of the experimental arrangement was such that the focal diameter at the level of the construction-field plane and in the centre of the construction field was 0.4 mm. A FocusMonitor from PRIMES GmbH was used for measurements at the focal point of the laser beam in the centre of the construction field in accordance with ISO 11146 (2nd moment method). A LM-1000 from Coherent Deutschland GmbH was used to measure laser power, and the average power is given here. The measurements were made in a laboratory at 23° C./50% humidity. Laser power control was achieved in the examples by control equipment operating with pulse width modulation (PWM) with a switching frequency of 10 kHz.

The powder material used comprised a nylon-12 with the properties given in Table 1.

TABLE 1

Powder material used

| | Value | Unit | Type of test/test equipment/test parameters |
|---|---|---|---|
| Polymer | Nylon-12 | | |
| Bulk density | 0.455 | g/cm$^3$ | DIN EN ISO 60 |
| d50 grain size | 56 | μm | Malvern Mastersizer 2000, dry measurement, 20-40 g of powder by means of Scirocco dry dispersion equipment. Feed rate of vibratory chute 70%, dispersion air pressure 3 bar. Specimen measurement time 5 seconds (5000 individual measurements), refractive index and blue-light value defined as 1.52 Evaluation by way of Mie theory. |
| d10 grain size | 38 | μm | Malvern Mastersizer 2000, parameters see d50 grain size |
| d90 grain size | 79 | μm | Malvern Mastersizer 2000, parameters see d50 grain size |
| <10.48 μm | 3 | % | Malvern Mastersizer 2000, parameters see d50 gram size |
| Pourability | 24 | s | DIN EN ISO 6186, method A, nozzle outlet diameter 15 mm |
| Solution viscosity | 1.59 | — | ISO 307, Schott AVS Pro, solvent acidic m-cresol, volumetric method, two measurements, dissolution temperature 100° C., dissolution time 2 h, polymer concentration 5 g/l Measurement temperature 25° C. |
| BET (spec. surface area) | 7.1 | m$^2$/g | ISO 9277, Micromeritics TriStar 3000, nitrogen gas adsorption, discontinuous volumetric method, 7 measurement points at relatively pressures P/P0 from about 0.05 to about 0.20, dead volume calibration by means of He (99.996%), specimen preparation 1 h at 23° C. + 16 h at 80° C. in vacuo, spec, surface area based on devolatilised specimen, evaluation by means of multipoint determination |
| melting point, 1st heating procedure | 187 | ° C. | DIN 53765 DSC 7 from. Perkin Elmer, heating/cooling rate 20 K/min |
| Recrystallisation temperature | 139 | ° C. | DIN 53765 DSC 7 from. Perkin Elmer, heating/cooling rate 20 K/min |
| Conditioning of material | Material is aged for 24 h at 23° C. and 50% humidity prior to processing | | |

Example 1

Not According to the Invention

The laser used ($CO_2$, wavelength 10.6 μm) was a Synrad Firestar t100W. A Synrad UC-2000 was used to control laser power. The power supply used was a Synrad DC-100. The scanner used was a Scanlab powerSCAN 50 mit varioSCAN 60. The energy input to the laser was 60 mJ/mm$^2$ (laser power 20.6 W, distance between irradiation lines 0.3 mm). The laser beam was controlled in such a way that the irradiation lines were straight-line segments bounded by the edge of the area requiring hardening. The velocity in the direction of the ideally straight-line segment was 1144 mm/s. The average time required to traverse the area requiring irradiation was 30.6 seconds.

Example 2

Not According to the Invention

The laser used ($CO_2$, wavelength 10.6 μm) was a Synrad Firestar t100W. A Synrad UC-2000 was used to control laser power. The power supply used was a Synrad DC-100. The scanner used was a Scanlab powerSCAN 50 mit varioSCAN 60. The energy input to the laser was 60 mJ/mm$^2$ (laser power 41.2 W, distance between irradiation lines 0.6 mm). The laser beam was controlled in such a way that the irradiation lines were straight-line segments bounded by the edge of the area requiring hardening. The velocity in the direction of the ideally straight-line segment was 1144 mm/s. The average time required to traverse the area requiring irradiation was 14.9 seconds.

Example 3

Not According to the Invention

The laser used ($CO_2$, wavelength 10.6 μm) was a Synrad Firestar t100W. A Synrad UC-2000 was used to control laser power. The power supply used was a Synrad DC-100. The scanner used was a Scanlab powerSCAN 50 mit varioSCAN 60. The energy input to the laser was 60 mJ/mm$^2$ (laser power 55 W, distance between irradiation lines 0.8 mm). The laser beam was controlled in such a way that the irradiation lines were straight-line segments bounded by the edge of the area requiring hardening. The velocity in the direction of the ideally straight-line segment was 1144 mm/s. The average time required to traverse the area requiring irradiation was 11.1 seconds.

Example 4

Not According to the Invention

The laser used ($CO_2$, wavelength 10.6 μm) was a Synrad Firestar t100W. A Synrad UC-2000 was used to control laser power. The power supply used was a Synrad DC-100. The scanner used was a Scanlab powerSCAN 50 mit varioSCAN 60. The energy input to the laser was 60 mJ/mm$^2$ (laser power 68.6 W, distance between irradiation lines 1.0 mm). The laser beam was controlled in such a way that the irradiation lines were straight-line segments bounded by the edge of the area requiring hardening. The velocity in the direction of the ideally straight-line segment was 1144 mm/s. The average time required to traverse the area requiring irradiation was 8.1 seconds.

Example 5

According to the Invention

The laser used ($CO_2$, wavelength 10.6 μm) was a Synrad Firestar t100W. A Synrad UC-2000 was used to control laser power. The power supply used was a Synrad DC-100. The scanner used was a Scanlab powerSCAN 50 mit varioSCAN 60. The energy input to the laser was 60 mJ/mm$^2$ (laser power 41.2 W). The laser beam was controlled the scanner in such a way as to conduct the irradiation lines (31) with an amplitude of 0.5 mm and a frequency of 100 Hz around the ideal segment (32) bounded by the edges of the component. The advance velocity of the laser beam was 1144 mm/s. The distance between the straight-line segments around which the irradiation lines oscillate was 0.6 mm. The average time required to traverse the area requiring irradiation was 14.9 seconds.

Example 6

According to the Invention

The laser used ($CO_2$, wavelength 10.6 μm) was a Synrad Firestar t100W. A Synrad UC-2000 was used to control laser power. The power supply used was a Synrad DC-100. The scanner used was a Scanlab powerSCAN 50 mit varioSCAN 60. There was moreover a movably mounted optically active element (19) in the form of a wedge prism located in the beam path of the laser. The wedge prism rotated at 174 revolutions/s. The energy input to the laser was 60 mJ/mm$^2$ (laser power 55 W). The laser beam was controlled in such a way as to conduct the irradiation lines (33) in the form of a cycloid around the ideal straight-line segments (34) bounded by the edges of the component. The diameter of the circle which described the cycloid was 2.1 mm. The advance velocity of the laser beam was 1144 mm/s. The distance between the straight-line segments around which the irradiation lines were conducted in the manner of a cycloid was 0.8 mm. The average time required to traverse the area requiring irradiation was 11.1 seconds.

Example 7

According to the Invention

The laser used ($CO_2$, wavelength 10.6 μm) was a Synrad Firestar t100W. A Synrad UC-2000 was used to control laser power. The power supply used was a Synrad DC-100. The scanner used was a Scanlab powerSCAN 50 mit varioSCAN 60. There was a movably mounted optically active element (19) in the form of a wedge prism located in the beam path of the laser. The wedge prism rotated at 400 revolutions/s. The energy input to the laser was 60 mJ/mm$^2$ (laser power 68.6 W). The control of the laser beam was such as to conduct the irradiation lines (33) with superposition of a translation motion on a rotary motion, around the ideal straight-line segments (34) bounded by the edges of the component. The diameter of the circle which described the rotary motion was 2.1 mm. The advance velocity of the laser beam was 1144 mm/s. The distance between the ideal segments around which the irradiation lines were conducted was 1 mm. The advance velocity of the laser beam was 1144 mm/s. The average time required to traverse the area requiring irradiation was 8.1 seconds.

Example 8

According to the Invention

The laser used ($CO_2$, wavelength 10.6 μm) was a Synrad Firestar t100W. A Synrad UC-2000 was used to control laser power. The power supply used was a Synrad DC-100. The scanner used was a Scanlab powerSCAN 50 mit varioSCAN 60. There was a movably mounted optically active element (19) in the form of a wedge prism located in the beam path of the laser. The wedge prism rotated at 400 revolutions/s. The energy input to the laser was mJ/mm$^2$ (laser power 89.2 W). The control of the laser beam was such as to conduct the irradiation lines (33) with superposition of a translation motion on a rotary motion, around the ideal straight-line segments (34) bounded by the edges of the component. The diameter of the circle which described the rotary motion was 2.1 mm. The advance velocity of the laser beam was 1144 mm/s. The distance between the ideal segments around which the irradiation lines were conducted was 1.3 mm. The advance velocity of the laser beam was 1144 mm/s. The average time required to traverse the area requiring irradiation was 6.2 seconds.

Table 2 collates the mechanical properties of the components from the individual examples.

TABLE 2

| Example | Modulus of elasticity [MPa] | Tensile strength [MPa] | Tensile strain at break [MPa] | Required irradiation time [s] | Distance between irradiation lines [mm] |
|---|---|---|---|---|---|
| 1 | 1725 | 45.4 | 19.2 | 30.6 | 0.3 |
| 2 | 1732 | 44.2 | 12.3 | 14.9 | 0.6 |
| 3 | 1653 | 39.3 | 8.4 | 11.1 | 0.8 |
| 4 | 1627 | 22.6 | 2.7 | 8.1 | 1 |
| 5 | 1692 | 45.6 | 18.8 | 14.9 | 0.6 |
| 6 | 1713 | 45.5 | 19.3 | 11.1 | 0.8 |
| 7 | 1695 | 45.4 | 18.7 | 8.1 | 1.0 |
| 8 | 1704 | 45.7 | 18.8 | 6.2 | 1.3 |

When, as in Examples 5-8 according to the invention, the irradiation lines are non-linear, the distances between the irradiation lines may be increased for the same laser energy input without adverse effect to mechanical properties. It was therefore also possible in the examples according to the invention to reduce irradiation time without any reduction in the levels of mechanical properties of the components.

Numerous modifications and variations on the present invention are possible in light of the above disclosure. It is therefore to be understood that within the scope of the appended claims, the invention may be practiced otherwise than as specifically described herein.

The invention claimed is:

1. A process for layer-by-layer production of a three-dimensional object, the process comprising:
    applying a layer of a powder material which is hardenable by exposure to electromagnetic radiation onto a vertically moveable construction platform in a construction chamber to obtain a planar layer;
    focusing a beam of electromagnetic radiation through a lens on a plane of the material layer;
    traversing the focused beam across the plane of the material layer in a series of non-linear paths comprising a superposition of a translational motion on a rotary motion as directed by a control unit;

selectively melting the material under the focus of the beam according to the control unit to obtain a layer having a completed melt pattern;

lowering the vertically moveable construction platform; and adding a layer of the powder material which is hardenable by exposure to electromagnetic radiation onto the layer having a completed melt pattern;

repeating the controlled melting; and continuously adding a further layer of the powder material which is hardenable over the previous completed layer and repeating the controlled melting until the melt pattern of the three dimensional object is formed;

cooling the melt pattern to harden to the three dimensional shape; and removing the three dimensional object from adhering powder material not melted by the focused beam.

2. The process for layer-by-layer production of a three-dimensional object, according to claim 1, wherein a distance between adjacent non-linear paths of the series is from 0.3 to 1.3 mm.

3. The process for layer-by-layer production of a three-dimensional object, according to claim 2, wherein the distance between adjacent non-linear paths of the series is from 0.6 mm to 1.3 mm.

4. The process for layer-by-layer production of a three-dimensional object, according to claim 1, further comprising controlling a temperature of the construction chamber.

5. The process for layer-by-layer production of a three-dimensional object, according to claim 1, further comprising heating the material layer to a temperature of from 100° C. to 360° C.

6. The process for layer-by-layer production of a three-dimensional object, according to claim 1, further comprising inertizing a construction field plane of the powder material layer.

7. The process for layer-by-layer production of a three-dimensional object, according to claim 1, wherein the powder material which is hardenable is selected from the group consisting of a polymer powder, a metallic powder and a ceramic powder.

8. The process for layer-by-layer production of a three-dimensional object, according to claim 7, wherein the powder material which is hardenable is a polymer powder and the polymer powder comprises at least one polymer selected from the group consisting of polyethylene, polypropylene, a polyamide, a polyester, a polyester ester, a polyether ester, a polyphenylene ether, a polyacetal, a polyalkylene terephthalate, a polymethyl methacrylate, a polyvinyl acetal, a polyvinyl chloride, a polyphenylene oxide, a polyoxymethylene, a polystyrene, a acrylonitrile-butadiene-styrene, a polycarbonate, a polyether sulfone, a thermoplastic polyurethane, a polyaryl ether ketone, a polyether ether ketone, a polyether ketone ketone, a polyether ether ketone ketone, a polyaryl ether ether ether ketone, a polyether ketone ether ketone ketone, a polyetherimide, a polyarylene sulphide, a thermoplastic polyimide, a polyamideimide, a polyvinylidene fluoride and copolymers thereof.

9. The process for layer-by-layer production of a three-dimensional object, according to claim 8, wherein the polymer powder comprises a polyamide and the polyamide is at least one selected from the group of polyamides consisting of PA6, PA66, PA610, PA613, PA1010, PA106, PA11, PA12, PA1012 and PA1013.

10. The process for layer-by-layer production of a three-dimensional object, according to claim 1, wherein the rotary motion is in a form selected from the group consisting of a conventional cycloid, a curtate cycloid and a prolate cycloid.

* * * * *